(12) United States Patent
Bailey et al.

(10) Patent No.: US 9,000,639 B2
(45) Date of Patent: Apr. 7, 2015

(54) MOUNTING CAP FOR INSULATED STATOR OF OUTER ROTOR MOTOR

(75) Inventors: Daniel E. Bailey, St. Louis, MO (US); L. Ranney Dohogne, Creve Coeur, MO (US); Daniel E. Hilton, St. Louis, MO (US); Philip S. Johnson, Granite City, IL (US)

(73) Assignee: Nidec Motor Corporation, St. Louis, MO (US)

( * ) Notice: Subject to any disclaimer, the term of this patent is extended or adjusted under 35 U.S.C. 154(b) by 94 days.

(21) Appl. No.: 13/312,723

(22) Filed: Dec. 6, 2011

(65) Prior Publication Data

US 2013/0140926 A1    Jun. 6, 2013

(51) Int. Cl.
  *H02K 11/00*   (2006.01)
  *H02K 1/18*    (2006.01)
  *H02K 3/52*    (2006.01)

(52) U.S. Cl.
  CPC ............. *H02K 3/522* (2013.01); *H02K 1/187* (2013.01); *H02K 2203/06* (2013.01)

(58) Field of Classification Search
  USPC ................. 310/43, 45, 71, 194, 260
  See application file for complete search history.

(56) References Cited

U.S. PATENT DOCUMENTS

| | | | | |
|---|---|---|---|---|
| 5,477,096 A | * | 12/1995 | Sakashita et al. | 310/216.016 |
| 6,124,660 A | * | 9/2000 | Umeda et al. | 310/215 |
| 6,333,576 B1 | * | 12/2001 | Ishikawa et al. | 310/85 |
| 6,333,579 B1 | * | 12/2001 | Hirano et al. | 310/194 |
| 6,856,055 B2 | * | 2/2005 | Michaels et al. | 310/71 |
| 7,138,741 B2 | * | 11/2006 | Lee | 310/216.091 |
| 7,492,067 B2 | * | 2/2009 | Kotajima | 310/71 |
| 8,049,381 B2 | * | 11/2011 | Lu | 310/67 R |
| 2006/0091739 A1 | * | 5/2006 | Hilton et al. | 310/45 |
| 2011/0241452 A1 | * | 10/2011 | Hong | 310/43 |

* cited by examiner

*Primary Examiner* — Dang Le
(74) *Attorney, Agent, or Firm* — Hovey Williams LLP

(57) ABSTRACT

A mounting cap is provided for use with an insulated stator of an outer rotor motor. The mounting cap is configured to support the stator and is fixed to the stator to prevent relative rotation therebetween. The mounting cap includes mounting structure configured to fix the mounting cap to the machine, such that the stator is fixed to and supported on the machine by the mounting cap. Furthermore, the mounting cap is configured to facilitate routing of wiring associated with the stator.

20 Claims, 8 Drawing Sheets

MOUNTING CAP FOR INSULATED STATOR OF OUTER ROTOR MOTOR

BACKGROUND OF THE INVENTION

1. Field of the Invention

The present invention relates generally to an electric motor for use in a machine. More specifically, the present invention concerns an electric motor that includes a rotor, an insulated stator, and a mounting cap.

2. Discussion of the Prior Art

Those of ordinary skill in the art will appreciate that electric motors are often used in home appliances such as dishwashers and washing machines. In a washing machine, for instance, an electric motor may be used to cause rotation of the washer basket to agitate the clothing contained therein. Although a variety of motor component arrangements may be used, one known embodiment of an electric motor includes a stator positioned at least in part radially inside a rotor. An electric motor having such a configuration is commonly referred to as an outer rotor motor or external rotor motor, although other names may be used. In the case of a washing machine having an electric motor of this sort, the rotor is typically coupled to the washer basket, whereas the stator is fixed to a tub mounting hub that is coupled to a stationary washer outer tub. To avoid potential electrical shock of the user, the stator is mounted in such a manner that it is electrically isolated from the tub.

The stator of an outer rotor motor typically includes a core and a plurality of coils. Conventionally, the core takes a generally toroidal form and is composed of a ferromagnetic metal such as iron or steel. The core typically includes a plurality of teeth projecting radially outwardly and defining slots therebetween. The coils are formed by the winding of electrically conductive wire multiple times around each tooth to at least partially fill the slots. Copper wire is commonly used due to its low electrical resistivity.

The rotor of an outer rotor motor typically includes a shaft, a support structure coupled to the shaft, and a plurality of permanent magnets supported by the support structure so that they circumscribe the stator in a spaced relationship. When an electrical current flows through the coils formed around each tooth of the stator core, the ferromagnetic material of the core is energized to form a plurality of magnetic fields corresponding to the teeth. These stator magnetic fields interact with the magnetic fields produced by the permanent magnets of the rotor to induce relative rotation between the rotor and stator. The direction of each magnetic field is dependent on the direction of the current flow around the respective tooth. Although a variety of approaches may be used to ensure appropriate field directions, one embodiment of an electric motor includes a stator having coils wound clockwise around some teeth and coils wound counter-clockwise around other teeth to produce oppositely directed magnetic fields within the same stator when the wires are exposed to a direct current.

While conventional outer rotor motors have been satisfactory in some respects, those of ordinary skill in the art will appreciate that conventional motors often have large cores. The metal of these cores is both expensive and heavy, leading to higher costs and decreased efficiency. Furthermore, use of the metal core to mount the stator in the machine is often inconvenient and expensive. More particularly, traditional outer rotor motors are also limited to a specific mounting arrangement incorporated into the core fabrication process. To use a conventional core in a different application requiring a different mounting arrangement, the core fabrication process must be varied (e.g., the lamination die for a laminated stator core must be re-machined).

Traditional stator designs also often use expensive copper wire and complicated and unwieldy insulation arrangements that virtually prevent the use of alternative, less expensive wiring, especially in confined applications having certain power requirements. Even with aluminum wound stators (such as a powder coated stator core wound with aluminum wiring), mounting of the stator, particularly within different machine applications, is still often a problem. Yet further, traditional designs often fail to assuredly secure wiring in place on the core.

SUMMARY

According to one aspect of the present invention, an outer rotor motor is provided that includes a rotor rotatable about an axis, an insulated stator spaced at least partially inside the rotor, and a mounting cap. The stator includes a core and wiring wound around the core. The mounting cap is configured to support the stator and is fixed to the stator to prevent relative rotation therebetween. The mounting cap is configured to facilitate routing of the wiring and includes a wiring outlet at which the wiring converges for connection to a power source. The mounting cap further includes mounting structure configured to fix the mounting cap to the machine, such that the stator is fixed to and supported on the machine by the mounting cap.

Among other things, incorporation of the mounting structure in the mounting cap rather than in the stator core allows the size of the stator core to be reduced and increases the ease with which the motor can be adapted for use with new mounting systems.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
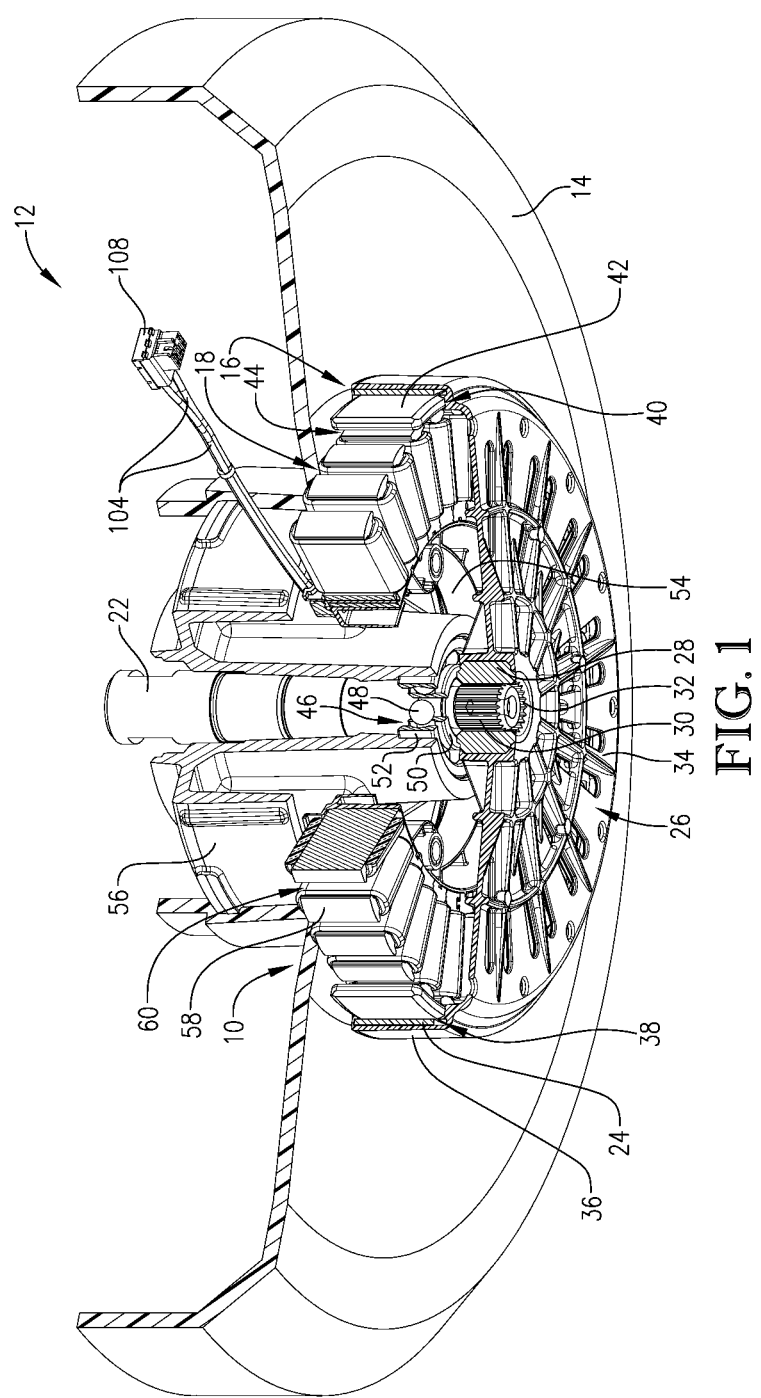
FIG. 1 is a partial sectional bottom isometric view of a portion of a machine constructed in accordance with the principles of a preferred embodiment of the present invention, depicting a portion of a washing machine and an outer rotor electric motor that includes, among other things, a rotor, a stator, and a mounting cap.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms.

While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an electric motor 10 constructed in accordance with a preferred embodiment of the present invention is depicted for use in a machine 12. Although a variety of machines are suitable, the particular machine depicted in FIG. 1 is a washing mashing having a stationary tub 14 and a rotatable washer or agitator basket (not shown). As is customary, the motor 10 broadly includes a rotor 16 and a stator 18 spaced partially inside the rotor 16.

The rotor 16 includes a rotatable shaft 20 connectable to the rotatable basket of the machine 12 at a machine connection end 22. The rotor 16 also includes a backing ring 24 located radially outwardly from the shaft 20 to circumscribe the stator 18 in a spaced relationship. Preferably, the backing ring 24 comprises a sheet of metal wrapped five times around the outer circumference of the stator 18 so that the backing ring 24 includes five layers. (For the sake of clarity, individual layers of the backing ring 24 are not shown in FIG. 1.) Preferably, the metal comprises iron. However, a ring comprising a different number of layers or a single layer and/or comprising one of more of a variety of materials falls within the scope of the present invention.

In the preferred embodiment illustrated in FIG. 1, the backing ring 24 is positioned within an interconnecting element 26 that connects the backing ring 24 to a central coupler 28. The central coupler 28 is fixed to the shaft 20 so that the shaft 20, coupler 28, element 26, and backing ring 24 all rotate together. In the illustrated embodiment, the shaft 20 has a splined end 30 that meshes with the splines 32 on the coupler 28, although other suitable means may be incorporated to rotationally fix the components to one another. Preferably, the interconnecting element 26 includes a spoked base 34 projecting radially from the coupler 28. The element 26 further includes a circumferentially extending support wall 36 that projects axially from the base 34 and cooperates therewith to define a circumferentially extending channel 38 that houses the backing ring 24. In the preferred embodiment, the interconnecting element also defines a plurality of circumferentially spaced slots 40 positioned radially inwardly of the channel 38. The slots 40 house a plurality of permanent magnets 42 shaped such that a circumferential space 44 between the magnets 42 and the stator 18 is retained. However, a variety of means by which the backing ring 24 and the magnets 42 are appropriately positioned fall within the ambit of the present invention. It is also noted that the interconnecting element 26 is preferably a plastic component overmolded to the element 26 and the coupler 28; however, the principles of the present invention are equally applicable to other outer rotor motor designs.

Preferably, the rotor 16 is rotationally supported on the tub 14 by a bearing assembly 46. In the preferred embodiment shown in FIG. 1, the bearing assembly 46 includes a plurality of ball bearings 48 disposed between an inner race 50 and an outer race 52, although a different bearing type or an entirely different rotation isolation mechanism could be used to similar effect without departing from the spirit of the present invention.

A mounting cap 54 is fixed to the stator 18 to prevent relative motion therebetween and includes mounting structure configured to fix the mounting cap 54 to the machine 12, such that the stator 18 is fixed to and supported on the machine 12 by the mounting cap 54. In a preferred embodiment shown in FIG. 1, the stator 18 is mounted onto the machine 12 via the fixation of the mounting cap 54 to a tub mounting hub 56. However, other means of fixing the mounting cap 54 to the machine 12, whether the machine 12 is a washing machine or another type of machine, are within the scope of the present invention. Additional details of the preferred embodiments of the mounting structure will be discussed in more detail below.

The mounting cap 54 is preferably composed of a synthetic resin material, although a different type or types of material, preferably being at least substantially electrically insulative, could be used without departing from the spirit of the present invention. Furthermore, more than one mounting cap 54 could be used, with one fixed to the top and another fixed to the bottom of the stator 18.

Figure 2:
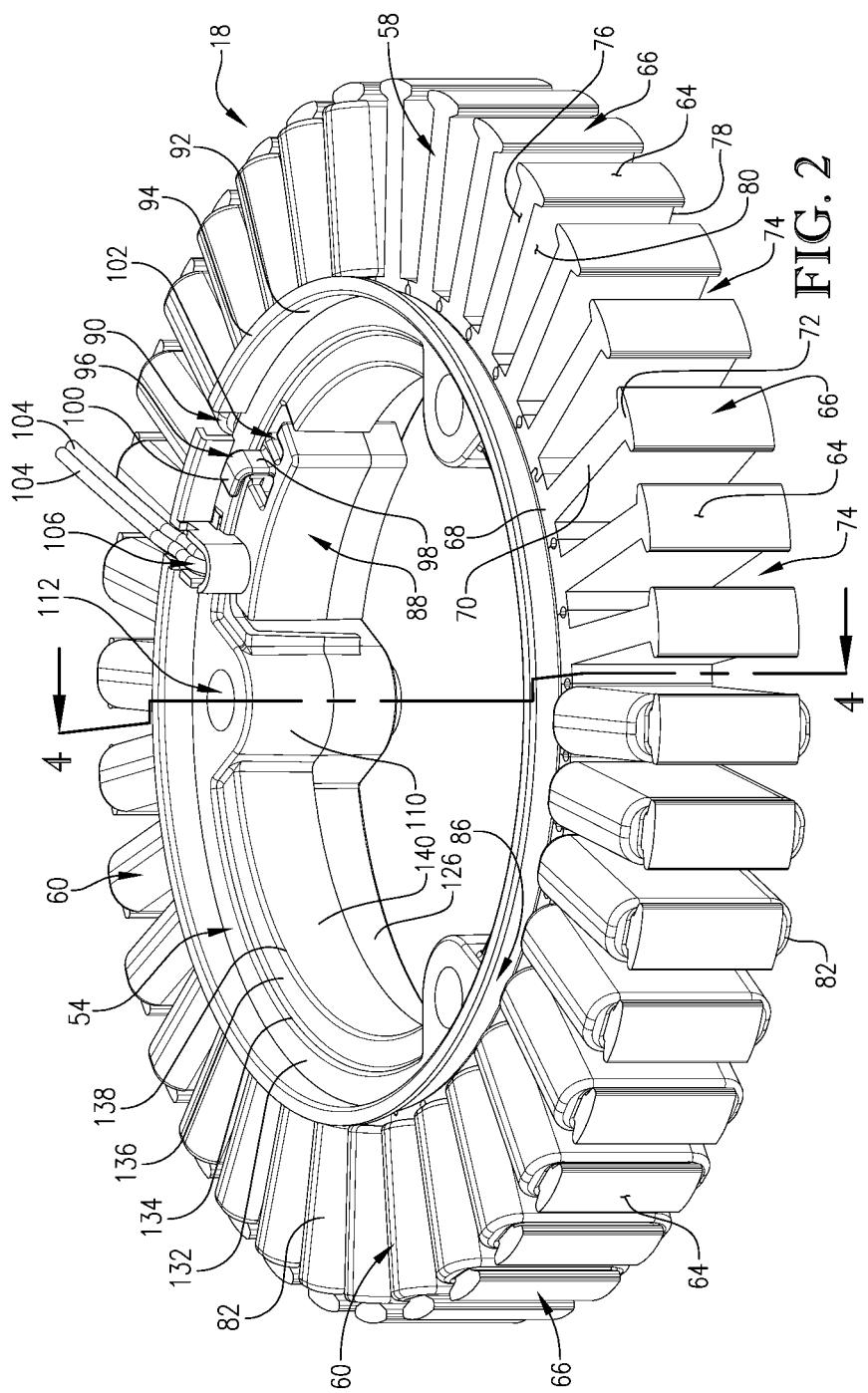
FIG. 2 is an enlarged isometric view of the stator and mounting cap of FIG. 1, shown from the top side.
Figure 3:
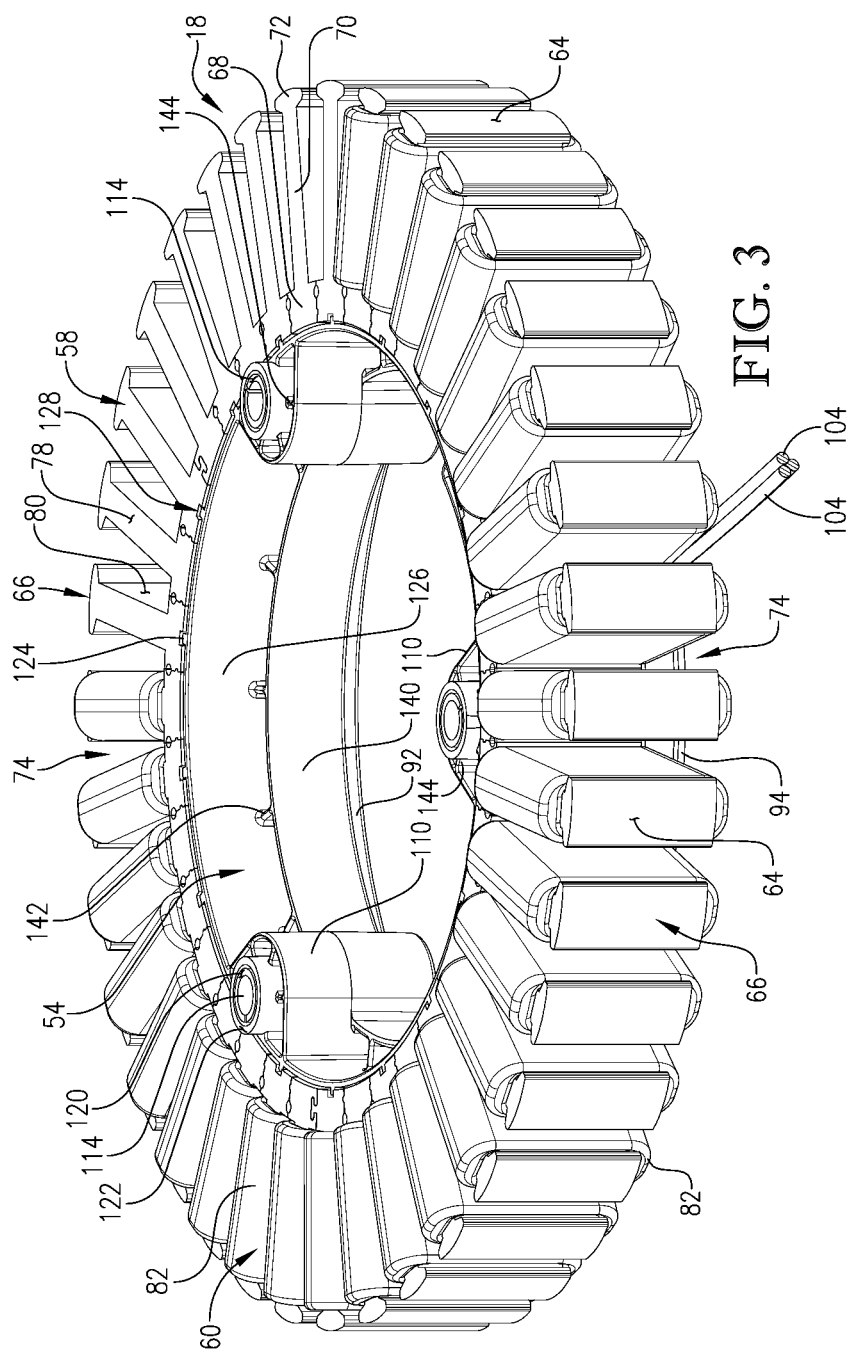
FIG. 3 is an enlarged isometric view of the stator and mounting cap of FIG. 1, shown from the bottom side.

As shown in FIGS. 2 and 3, the stator 18 includes a generally toroidal core 58 and a plurality of coils 60. In the preferred embodiment as shown, the core 58 presents radially inner and outer circumferential faces 62,64 and includes a plurality of radially projecting teeth 66, each of which comprises a yoke 68, an arm 70, and a crown 72. The yokes 68 are interconnected and collectively present the inner circumferential face 62, while the arms 70 and crowns 72 are arcuately spaced apart to define slots 74 therebetween. Each tooth 66 presents an upper face 76, a lower face 78, and two side faces 80. The crowns 72 of teeth 66 collectively present the outer circumferential face 64, which is thus discontinuous.

The stator core 58 preferably comprises a ferromagnetic material such as steel and is preferably a laminated structure. However, it is within the ambit of the invention for the core 58 to comprise an alternative material and be of an alternative structure. For instance, the core 58 could be integrally formed, be composed of iron, include a continuous annular base ring from which the teeth 66 project, or feature a combination of these or other variations known to one skilled in the art.

Figure 9:
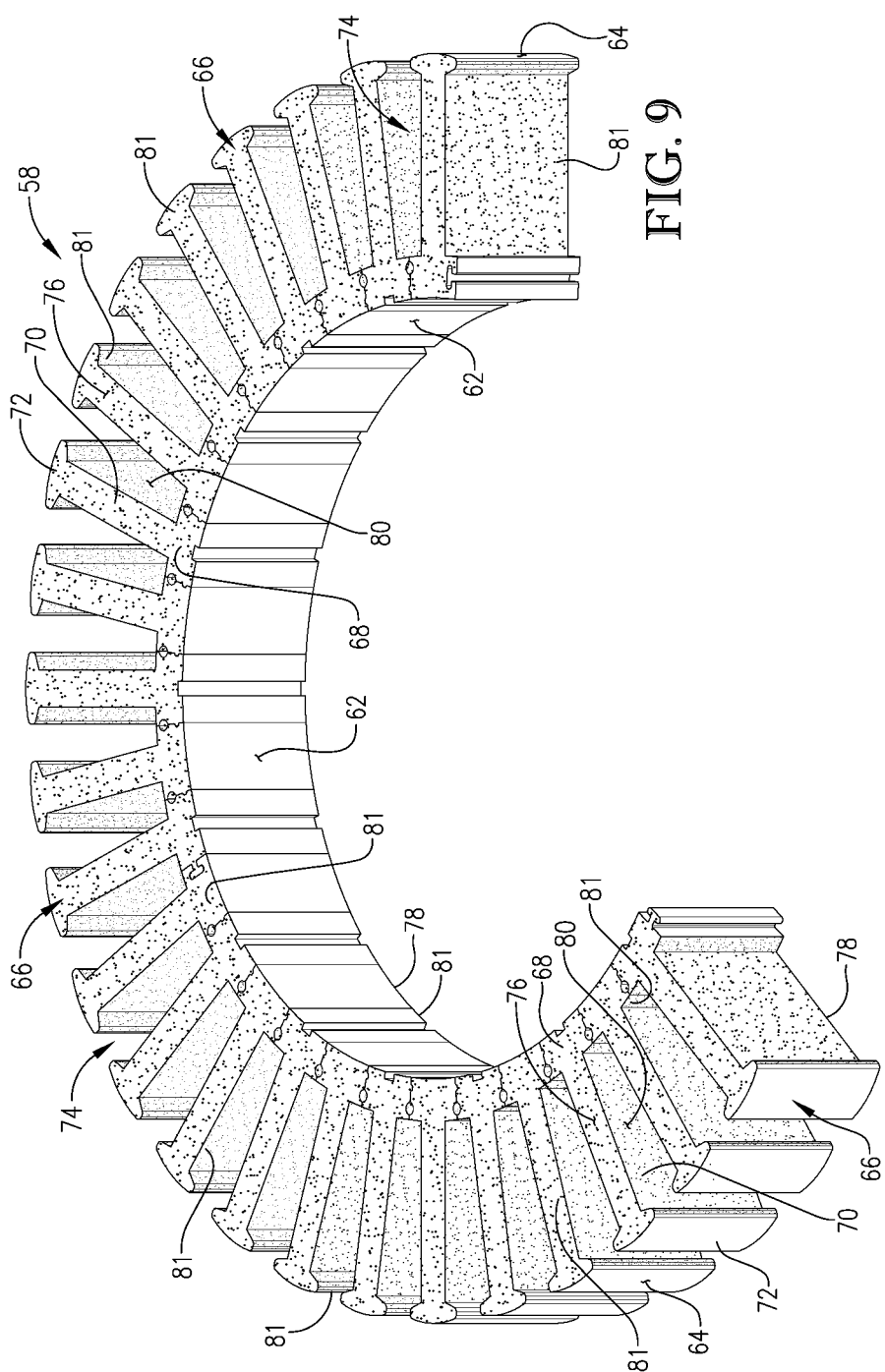
FIG. 9 is an enlarged, isometric view of a portion of the stator core of FIGS. 1-6, particularly depicting an electrically insulative coating placed on portions of the stator teeth.

In a preferred embodiment, as shown in FIG. 9, the stator core 58 is at least partly coated with an electrically insulative coating 81, preferably a powder coating. More preferably, the entire stator core 58 except the inner and outer circumferential faces 62,64 is powder coated. One suitable powder coating material is available from 3M™ under the designation Scotchcast™ Electrical Resin 5555. However, it is within the scope of the present invention for the stator core 58 to be insulated with other electrically insulative coatings (or low profile means that permit larger coils), as well as insulation arrangements that cover the core 58 to a lesser or greater degree than that shown.

The coils 60 of the stator 18 comprise electrically conductive wiring 82 wound multiple times around each individual tooth 66. The wiring 82 preferably substantially comprises a plurality of aluminum wires, although it is within the scope of the present invention to use other types of electrically conductive wires (such as copper). The wires may or may not be provided with coatings. (Note that the coils 60 are shown only schematically and have been removed from all or a plurality of the teeth 66 in some figures for the sake of clarity. However, in practice, the coils 60 would be found on each tooth 66 and would comprise multiple windings of the wiring 82.) As is customary, the wiring 82 is wound around the teeth 66 in a particular pattern according to phasing of the motor 10, as will be explained further hereinbelow.

Referring now to FIG. 2, the preferred embodiment of mounting cap 54 includes a wire routing structure 84 defining a wiring pathway 86 that projects generally from a wiring outlet 88, passes through an aperture 90, and extends arcuately along the core 58. More particularly, the wire routing structure 84 includes an axially projecting retaining wall 92 extending arcuately above and around the upper faces 76 of the yoke portions 68 of the teeth 66, as well as an overhanging flange 94 projecting radially outwardly from the retaining wall 92. The wiring pathway 86 is defined about the retaining wall 92 between the overhanging flange 94 and the upper faces 76 of the yoke portions 68 of the teeth 66. In the preferred embodiment, the wiring 82 extending between the coils 60 is guided along the wiring pathway 86 by the retaining wall 92, the overhanging flange 94, and the upper faces 76 of the yoke portions 68 of teeth 66. It is not necessary that the coils 60 between which the wiring 80 is guided be adjacent. In the preferred embodiment, for instance, a first tooth 66 and an adjacent second tooth 66 are wound with wiring 82 to form respective first and second coils 60. The wiring 82 is then drawn or extended along the retaining wall 92 and below the overhanging flange 94 to a third tooth 66 that is four teeth away from the second tooth 66. The wiring 82 is wound around the third tooth 66 and an adjacent fourth tooth 66 to form respective third and fourth coils 60, and the process is then repeated. Regardless of the particular wiring pattern used, the retaining wall 92 is critical to keeping the wiring 82 from being radially displaced and the overhanging flange 94 is critical to keeping the wiring 82 from being axially displaced as the wiring 82 extends between teeth 66. It will be readily appreciated by one of ordinary skill in the art, however, that other structure capable of guiding the wiring 82 between the coils 60 could be used without departing from the teachings of the present invention. (The wiring 82 extending along the pathway 86 or between the coils 60 is not shown in the figures for the sake of clarity.)

Figure 6:
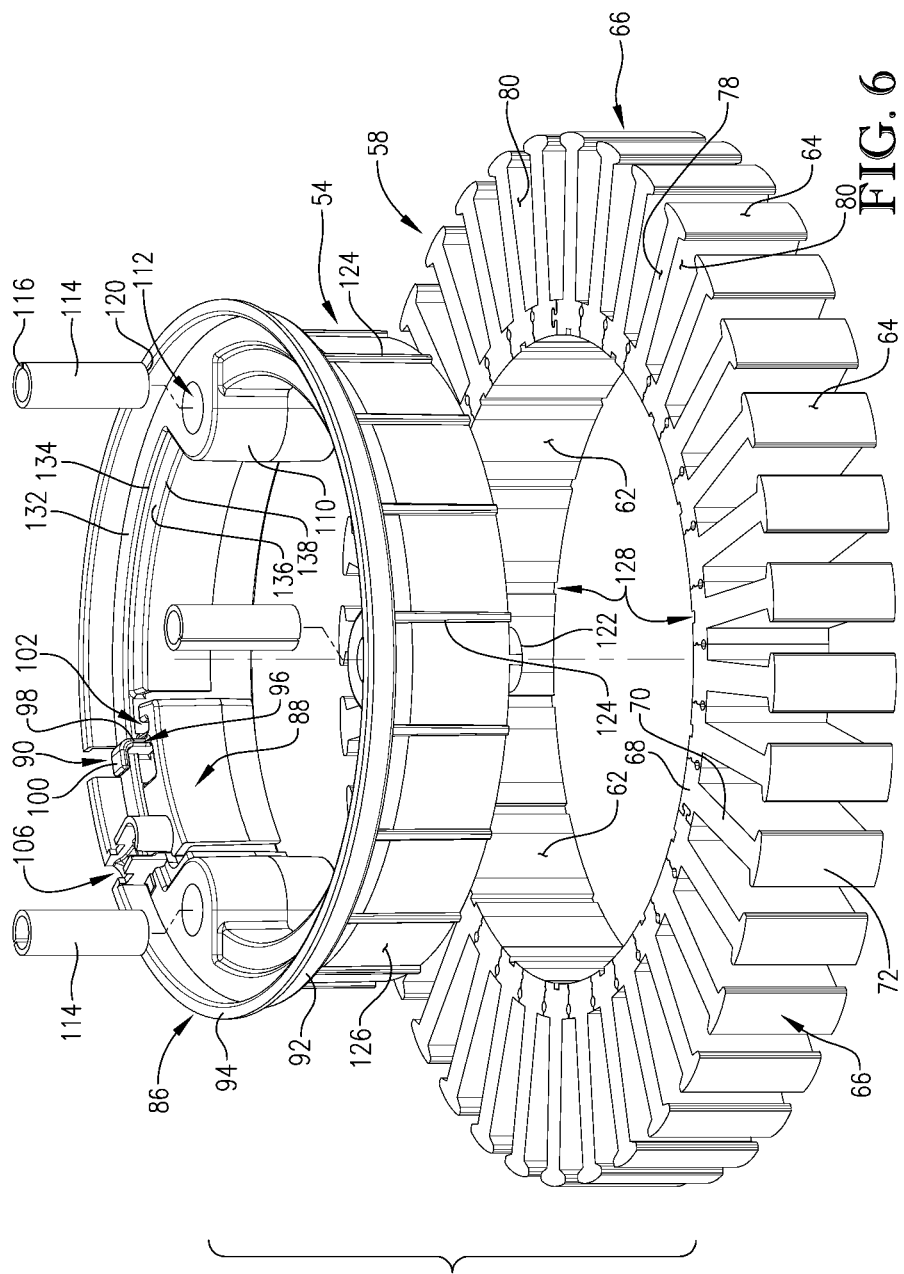
FIG. 6 is an exploded isometric view of the stator core and mounting cap of FIGS. 1-5, particularly depicting the alignment of the interengaging structures of the mounting cap and stator core and the radial thickness of the stator core.
Figure 7:
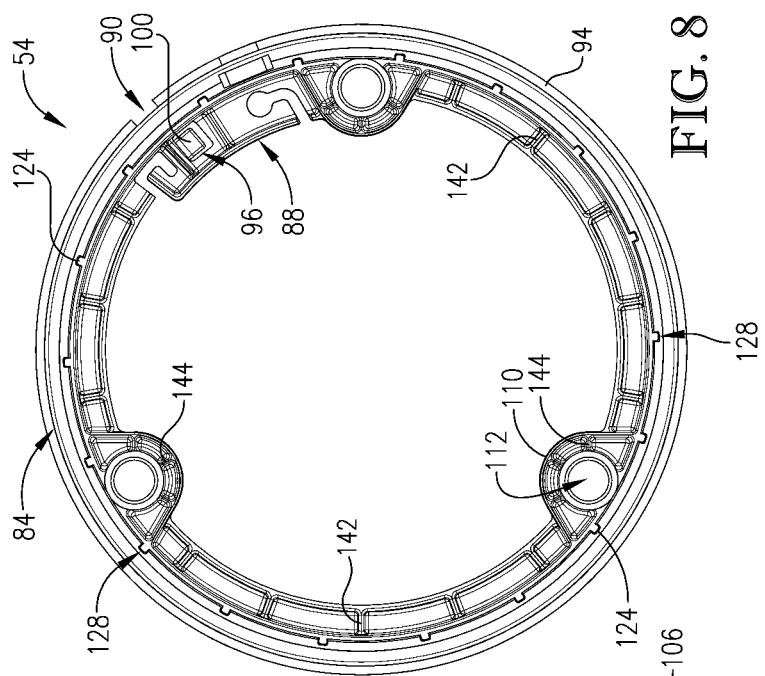
FIG. 7 is a top view of the mounting cap of FIGS. 1-6.

As best shown in FIGS. 2 and 6, the preferred embodiment of the mounting cap 54 includes a hook 96 that includes a shaft 98 and an arm 100. The shaft 98 projects substantially axially from the wiring outlet 88, and the arm 100 extends substantially perpendicularly from the shaft 98. The mounting cap 54 also includes a notch 102 that extends into the wiring outlet 88. The wiring 82 extends from the pathway 86 into the wiring outlet 88 by passing through the wiring aperture 90, under the arm 100 and around the shaft 98 of the hook 96, and into the notch 102. Within the wiring outlet 88, the terminal ends of the wiring 82 are formed into bundles 104 that exit the wiring outlet 88 through a portal 106. As shown in FIG. 1, in the preferred embodiment, the bundles 104 are joined at their ends by a crimp connector 108 that interfaces with a power source (not shown). However, use of alternate wire management components either integral to or separate from the mounting cap 54 is within the ambit of the present invention. For instance, an insulation-displacement connector (IDC) could be used in place of the wiring outlet 88.

As illustrated in FIG. 2 and others, the mounting cap 54 preferably includes a plurality of mounting bosses 110 projecting radially inwardly relative to retaining wall 92. In the preferred embodiment, the mounting bosses are spaced equally about the inside circumference of the mounting cap 54. As will be described in further detail below, this arrangement helps distribute loads when the mounting cap 54 is fixed to the machine 12 and supports the stator 18. Each mounting boss 110 defines a fastener-receiving opening 112. Furthermore, a bushing 114 (see, for instance, FIGS. 3 and 6) is preferably inserted into each of the fastener-receiving openings 112. The upper rim 116 of the bushing 114 aligns with an upper ledge 118 of the respective fastener-receiving opening 112, while the lower rim 120 of the bushing 114 aligns with the bottom edge 122 of the mounting cap 54 (see FIGS. 4 and 5). However, it is within the scope of the present invention for the mounting cap 54 to include alternative mounting structures that may or may not incorporate the bushings 114.

Figure 4:
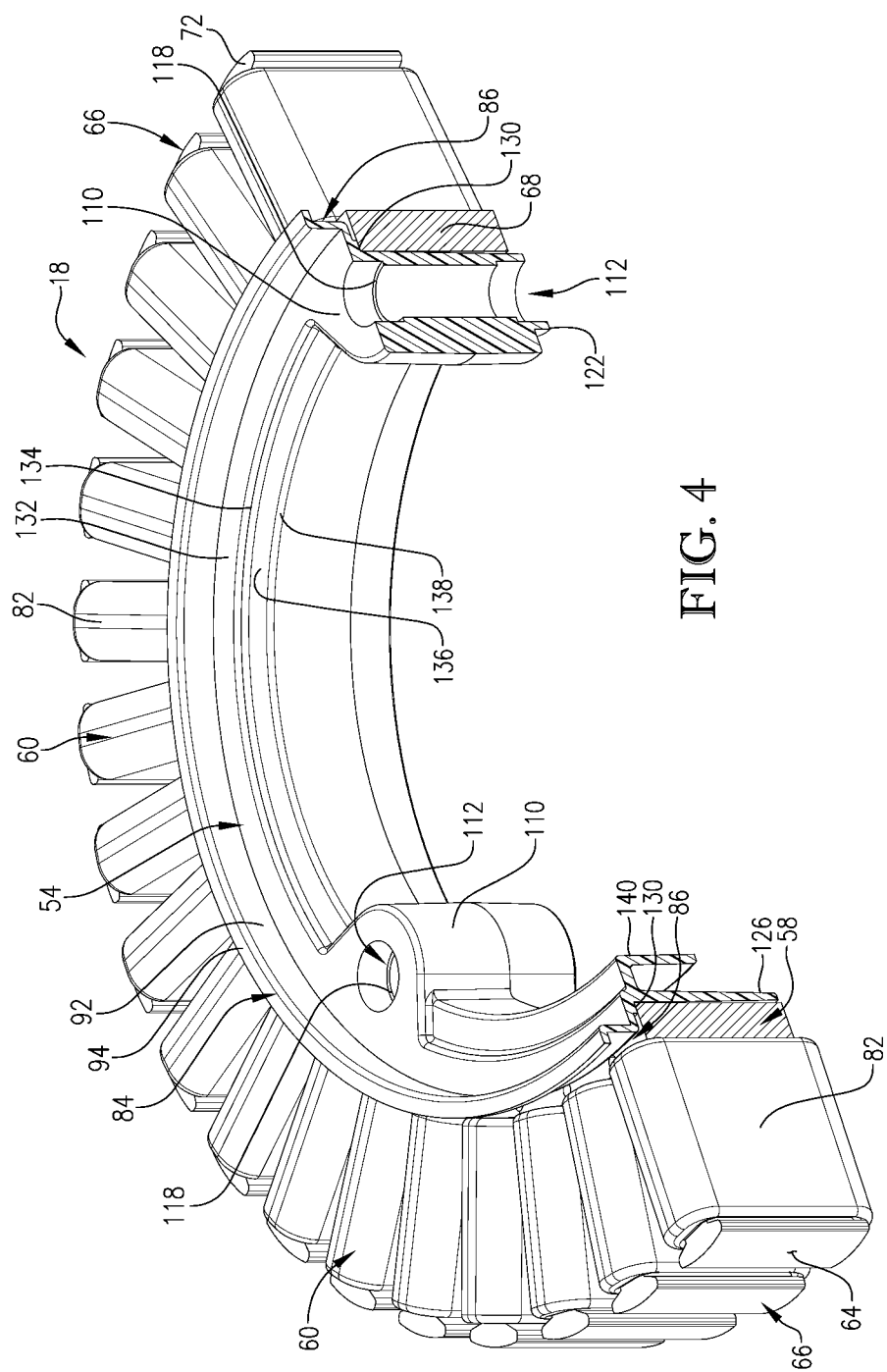
FIG. 4 is a sectional isometric view of a portion of the stator and mounting cap taken along line 4-4 of FIG. 2, particularly depicting the mounting hole configuration and the engagement of the mounting cap with the stator core.
Figure 5:
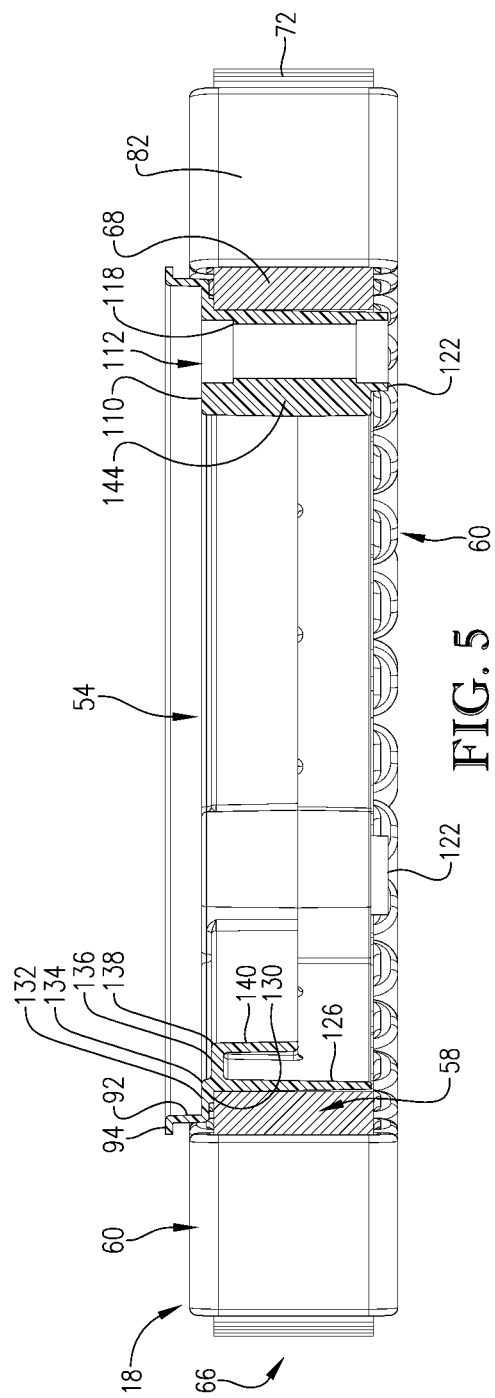
FIG. 5 is a sectional side view of a portion of the stator and mounting cap as shown in FIG. 4, particularly depicting the mounting hole configuration and the engagement of the mounting cap with the stator core.
Figure 8:
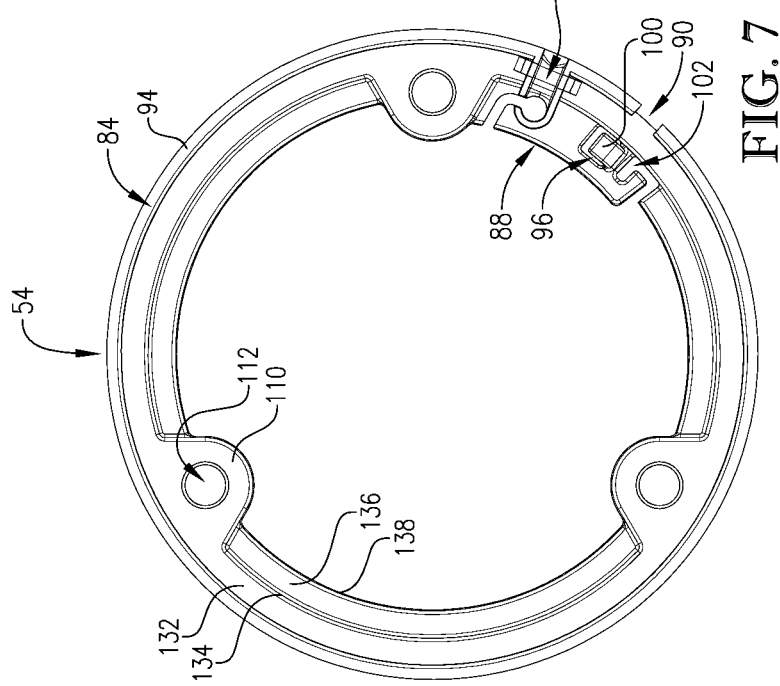
FIG. 8 is a bottom view of the mounting cap of FIGS. 1-7, particularly depicting the structural support ribs.

As best shown in FIGS. 3, 6, and 8, the mounting cap 54 and the stator 18 are preferably fixed relative to each other via insertion of a plurality of connecting pins 124, which protrude radially outwardly from the outer wall 126 of the mounting cap 54, into a corresponding plurality of grooves 128 formed in the inner face 62 of the core 58. In a preferred embodiment, the connecting pins 124 are heat stake pins that, upon application of appropriate heat, create a permanent bond between the mounting cap 54 and the stator 18 to prevent both relative rotational movement and relative longitudinal movement therebetween. Preferably, as is best illustrated in FIGS. 4 and 5, the mounting cap 54 is provided with a circumferentially extending shoulder 130 that is positioned flush with the upper faces 76 of the yokes 78 of the teeth 66 when the mounting cap 54 and the stator core 58 are in an appropriate position for heat staking. However, other means of relative positioning are within the scope of the present invention. It is also within the ambit of the present invention to alternatively utilize other fixation procedures (such as snap connection, adhesive bonding, ultrasonic welding, or insertion of threaded fasteners into corresponding threaded openings) to secure the cap 54 to the core 58.

In the preferred embodiment, the mounting cap 54 further includes a circumferentially extending first radial wall 132 extending radially inward from retaining wall 92 to a first edge 134, as well as a second radial wall 136 positioned slightly lower than the first radial wall 132 and extending radially inward from the first edge 134 to a second edge 138. The outer wall 126 extends downward from the first edge 134, while an inner wall 140 extends downward from the second edge 138. As best shown in FIGS. 3 and 8, a plurality of support ribs 142 extend between the inner wall 140 and the outer wall 126. Furthermore, a plurality of support ribs 144 is found in each of the mounting bosses 110. However, alternate means of providing structural support, including use of a solid mounting cap 54 construction, are within the ambit of the present invention.

For assembly of the preferred embodiment of the motor 10, the connecting pins 124 of the mounting cap 54 are first aligned with the grooves 128 in the inner face of the stator core 58. No clocking is necessary beyond that required to align one of the pins 124 with one of the grooves 128, with the remaining pins 124 and grooves 128 automatically falling into alignment. The mounting cap 54 and stator core 58 are then moved axially toward each other in such a manner that the pins 124 slide into the grooves 128. Relative axial motion ceases when the shoulder 130 is positioned flush with the upper faces 76 of the yokes 78 of the teeth 66. The pins 124 are then heat staked to form a permanent bond between the mounting cap 54 and the stator core 58. Next, the wiring 82 is wound about the stator core 58 to form the coils 60, with the mounting cap 54 providing guidance of the wiring 82 between the teeth 66. A bushing 114 is inserted into each fastener-receiving opening 112, and a fastener (not shown) is received within each bushing 114. Each fastener is then inserted into an opening (not shown) in the tub mounting hub 56 that is fixed to the stationary tub 14. Thus, the mounting cap 54 functions both as a wire routing device and as a support for the stator 18 when the mounting cap 54 is fixed to the machine 12.

In operation of the preferred machine embodiment shown in FIG. 1, an electrical signal travels from a power source (not shown), through the crimp connector 108, and through the wiring 82. The coils 60 energize the stator core 58, and the stator poles corresponding to each tooth 66 interact with the permanent magnets 42 and the backing ring 24 of the rotor 16 to induce rotation of the rotor 16, including the backing ring 24, the magnets 42, the interconnecting element 26, the central coupler 28, and the shaft 20, as well as the rotatable agitator or washer basket (not shown) of the machine 12. The tub 14, tub mounting hub 56, mounting cap 54, and stator 18 remain stationary. It is worth noting, however, that the mounting cap 54, which both supports the stator 18 and is fixed to the machine 12, is subject to both the weight of the stator 18 and to significant torsional loads. It is configured to withstand these loads at least in part due to the circumferential distribution of the mounting bosses 110 and the presence of support ribs 142,144.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An outer rotor motor for use in a machine, said motor comprising:
   a rotor rotatable about an axis;
   an insulated stator spaced at least in part radially inside the rotor,
   said stator including a core having an electrically insulative coating applied thereon,
   said core being toroidal in shape to present opposite axial faces and inner and outer circumferential faces,
   said core including a plurality of radially projecting teeth which cooperatively present the outer circumferential face,
   each of said teeth including a radial arm and a radially outermost crown,
   said stator further including wiring wound generally around the arms of the teeth; and
   a mounting cap supporting the stator and facilitating routing of the wiring,
   said mounting cap comprising a unitary body that extends along the inner circumferential face of the core between the axial faces thereof,
   said mounting cap being spaced from the arms and crowns of the teeth,
   said mounting cap including a wiring outlet at which the wiring converges for connection to a power source,
   said mounting cap including wiring routing structure configured to facilitate routing of the wiring to the wiring outlet,
   said mounting cap being fixed to the stator to prevent relative rotation therebetween,
   said mounting cap including mounting structure configured to fix the mounting cap to the machine, such that the stator is fixed to and supported on the machine exclusively by the mounting cap,
   said mounting cap and said core comprising dissimilar materials,
   said core comprising a metal material,
   said mounting cap comprising an at least substantially electrically insulative synthetic resin material,
   at least one of said inner and outer circumferential faces being devoid of insulative coating,
   said mounting cap being fixed to said at least one of said inner and outer circumferential faces, such that the synthetic resin material directly engages the metal material,
   one of said mounting cap and said inner and outer circumferential faces of the stator core including a radially projecting rib and the other of said mounting cap and said inner and outer circumferential faces of the stator core including a groove that receives at least part of the rib so as to angularly orient the mounting cap and stator core relative to one another,
   said rib comprising a synthetic resin material that is heat staked within the groove so as to fix the mounting cap to the stator core.

2. The motor as claimed in claim 1,
said rotor including a central coupler connectable to the machine, a backing ring that is located radially outward from the coupler and circumscribes the stator in a spaced relationship, and an interconnecting component extending between the coupler and ring.

3. The motor as claimed in claim 2,
said rotor including a plurality of permanent magnets mounted adjacent the backing ring.

4. The motor as claimed in claim 1,
said teeth being at least partly coated with the electrically insulative coating.

5. The motor as claimed in claim 1,
said insulative coating comprising a powder coating.

6. The motor as claimed in claim 1,
both of said circumferential faces being devoid of insulative coating.

7. The motor as claimed in claim 6,
said outer circumferential face being discontinuous.

8. The motor as claimed in claim 1,
said wiring comprising a plurality of aluminum wires.

9. The motor as claimed in claim 1,
said wiring outlet having a generally box-shaped construction configured to receive terminal ends of the wiring therein.

10. The motor as claimed in claim 1,
said mounting cap being located generally inside the stator core.

11. The motor as claimed in claim 1,
said wiring routing structure defining a wiring pathway projecting generally from the wiring outlet and extending along the core.

12. The motor as claimed in claim 11,
said stator core presenting a central axis,
said wiring routing structure including an axially projecting wall that extends arcuately about the stator core.

13. The motor as claimed in claim 12,
said wiring routing structure including an overhanging flange that projects radially from the wall so as to restrict axial displacement of the wiring.

14. The motor as claimed in claim 13,
said wall being adjacent the inner circumferential surface,
said flange being spaced axially from the stator core and projecting radially outward from the wall, such that the wiring pathway is defined about the wall between the flange and stator core.

15. The motor as claimed in claim 14,
said wall and flange presenting a wiring opening adjacent the wiring outlet, with the wiring extending from the pathway, through the opening, and into the outlet.

16. The motor as claimed in claim 1,
said mounting structure including a plurality of mounting bosses, each defining a fastener receiving opening.

17. The motor as claimed in claim 16,
said mounting cap having a generally toroidal shape,
said mounting cap being located generally inside the stator core,
said mounting bosses being located along the inner circumference of the mounting cap.

18. A motor for use in a machine, said motor comprising:
a rotor rotatable about an axis;
an insulated stator,
said stator including a core having an electrically insulative coating applied thereon,
said core being toroidal in shape to present opposite axial faces and inner and outer circumferential faces,
said core including a plurality of radially projecting teeth which cooperatively present a first one of the circumferential faces,
each of said teeth including a radial arm and a radially endmost crown,
said stator further including wiring wound generally around the arms of the teeth; and
a mounting cap supporting the stator and facilitating routing of the wiring,
said mounting cap comprising a unitary body that extends along a second one of the circumferential faces of the core between the axial faces thereof,
said mounting cap being spaced from the arms and crowns of the teeth,
said mounting cap including a wiring outlet at which the wiring converges for connection to a power source,
said mounting cap including wiring routing structure configured to facilitate routing of the wiring to the wiring outlet,
said mounting cap being fixed to the stator to prevent relative rotation therebetween,
said mounting cap including mounting structure including a plurality of fasteners that fix the mounting cap to the machine,
said core being spaced from the fasteners,
said mounting cap and said core comprising dissimilar materials,
said core comprising a metal material,
said mounting cap comprising an at least substantially electrically insulative synthetic resin material,
at least one of said inner and outer circumferential faces being devoid of insulative coating,
said mounting cap being fixed to said at least one of said inner and outer circumferential faces, such that the synthetic resin material directly engages the metal material,
one of said mounting cap and said inner and outer circumferential faces of the stator core including a radially projecting rib and the other of said mounting cap and said inner and outer circumferential faces of the stator core including a groove that receives at least part of the rib so as to angularly orient the mounting cap and stator core relative to one another,
said rib comprising a synthetic resin material that is heat staked within the groove so as to fix the mounting cap to the stator core.

19. The motor of claim 18,
said core circumscribing the fasteners.

20. The motor of claim 19,
said motor being an outer rotor motor.

* * * * *